United States Patent [19]

Morikawa et al.

[11] Patent Number: 5,136,688
[45] Date of Patent: Aug. 4, 1992

[54] PRINT DATA PROCESSING APPARATUS FOR AN IMAGE FORMING APPARATUS

[75] Inventors: Takashi Morikawa; Ikunori Yamaguchi, both of Toyokawa, Japan

[73] Assignee: Minolta Camera Kabushiki Kaisha, Osaka, Japan

[21] Appl. No.: 742,067

[22] Filed: Aug. 7, 1991

Related U.S. Application Data

[63] Continuation of Ser. No. 589,013, Sep. 27, 1990, abandoned.

[30] Foreign Application Priority Data

Sep. 29, 1989 [JP] Japan .................................. 1-255413
Sep. 29, 1989 [JP] Japan .................................. 1-255414

[51] Int. Cl.⁵ .............................................. G06K 15/00
[52] U.S. Cl. ..................................... 395/115; 395/116
[58] Field of Search ........ 395/101, 115, 116, 164–166; 358/298, 467, 296, 444, 451; 346/154; 400/62, 65; 382/41, 56

[56] References Cited

U.S. PATENT DOCUMENTS

4,516,139  5/1985  Takiguchi ........................... 358/296
4,590,585  5/1986  Cummings et al. .................. 395/101
4,682,190  7/1987  Ikeda ................................... 346/154

FOREIGN PATENT DOCUMENTS

61-290526  12/1986  Japan ................................. 364/519

Primary Examiner—Arthur G. Evans
Attorney, Agent, or Firm—Burns, Doane, Swecker & Mathis

[57] ABSTRACT

There is disclosed a print data processing apparatus for an image forming apparatus for receiving print data from an external unit, converting the received print data into dot image data at every one of bands defined by dividing an image area of one page, and outputting the dot image data to a printer so as to form all the image of one page corresponding to the print data on a piece of printing paper. In the print data processing apparatus, print data received from the external unit are sequentially analyzed and converted into intermediate data, and the converted intermediate data are stored in a first storage unit. Thereafter, an edit controller judges which band the intermediate data stored in the first storage unit belong to, and registers judged band information of the intermediate data in a band table of a further storage unit. The intermediate data are developed into dot image data every band referring to the band information registered in the band table, and the developed dot image data are stored in a second storage unit. Finally, the dot image data stored in the second storage unit are outputted to the printer in order to print the image thereof on a piece of printing paper.

14 Claims, 15 Drawing Sheets

Document of one page

Packet area

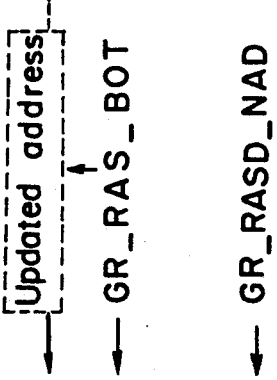

Fig. 12

| | Divided packet No. | Divided packet No. |
|---|---|---|
| 0w | | |
| 1w | Number of patterns stored at present | |
| 2w | Character specifications of each band | |
| 3w | | ⎫ Head address |
| 4w | | ⎭ and Segment of Packet |
| 5w | | ⎫ Next address |
| 6w | | ⎭ and Segment of Packet |

Fig. 13

C table

| | |
|---|---|
| End page pointer | ← End document No. |
| Current page pointer | ← Document which is being edited at present |
| Extended packet start pointer | |
| Extended packet end pointer | |
| Storing area start pointer | |
| Storing area end pointer | |

PRINT DATA PROCESSING APPARATUS FOR AN IMAGE FORMING APPARATUS

This application is a continuation of application Ser. No. 07/589,013 filed Sep. 27, 1990 now abandoned.

BACKGROUND OF THE INVENTION

1. Field of the Invention

The present invention relates to a print data processing apparatus for an image forming apparatus, and more particularly, to a print data processing apparatus for an image forming apparatus such as a printer controller for generating character dot image data to be printed on a piece of printing paper.

2. Description of the Related Art

Generally speaking, a printer controller provided in a printer develops character data and graphic data etc. into dot image data on a bit map memory according to character data, graphic data and various kinds of commands which have been received from a host computer so as to store them therein, and then, sends to a print head section of a printer the developed dot image data so as to print the dot image thereof on a piece of printing paper.

Conventionally, the printer controller has a bit map memory having a memory capacity of one page, and develops dot image data of one page on the bit map memory according to character data and graphic data which have been received from the host computer. Then, after the development of one page thereon is completed, the dot image data are sent to the print head section. Since the printer controller is constructed as described above, there is no problem caused by a difference between a timing when the dot image data are developed onto the bit map memory and a timing when the dot image data are sent to the print head section.

In the conventional printer controller of this type, when the dot image data are transferred to the print head section, all the dot image data of one page to be outputted thereto have been already developed on the bit map memory. Therefore, the dot image data are transferred to the print head section at a high speed in synchronous with printing them on a piece of printing paper by the print head section.

In order to output the dot image data to the print head section in a higher speed, it is necessary to shorten the time necessary for developing the dot image data on the bit map memory as soon as possible. However, generally, in the case of processing graphic data, it takes a relatively long time to receive the graphic data because of much amount of data. Particularly, in the case of processing vector graphic data, it takes an extremely long time to analyze commands and to develop the vector graphic data into the dot image data on the bit map memory.

In order to solve the above-mentioned problems, the graphic data can be processed in a higher speed by utilizing an LSI used only for developing the dot image data on the bit map memory, however, the cost thereof increases.

On the other hand, in the case of processing the graphic image data by software, if all the processes such as the analysis of the commands and the development of the dot image data are performed in synchronous with outputting the dot image data to the print head section, the dot image data can not be outputted thereto in a high speed.

In order to lighten the load to be applied onto the printer controller upon developing the data received from the host computer into the dot image data on the bit map memory, an intermediate process is performed such as a process for storing intermediate data in an intermediate data storing memory after converting the received data into the intermediate data.

Upon developing the image data in the printer controller, there may be used such a method that a document of one page is divided into plural n bands in a subscan direction and the document data are processed in a unit of band, wherein n is a positive integer. A printer controller utilizing this method comprises two band memories or two partial bit map memories, each memory having a memory capacity which is 1/n of that of the bit map memory of one page. In the printer controller of this type, while dot image data are developed on one band memory, the image data which have been already developed on another band memory are outputted to the print head section, simultaneously. These processes are performed alternately and repeatedly utilizing the two band memories for the document image of the n bands, and then, the print operation for printing the document image of one page on a piece of printing paper is completed.

Even though this method is used, it is necessary to perform the process for developing the dot image data onto the band memory prior to outputting them to the print head section. Therefore, the speed at which the data are outputted to the print head section is limited by the speed at which the dot image data are developed onto the band memory. Accordingly, in order to perform the process for developing the dot image data thereon in a high speed, the data received from the host computer may be once converted into intermediate data. The intermediate data are composed of character data to be developed onto the band memory and information of graphic data such as the size thereof, the source address.

In the printer controller utilizing this method, it is necessary to develop the dot image data on respective band memories in a high speed. Therefore, it is necessary to convert the received data into the intermediate data of one page necessary for developing them prior to printing them on a piece of printing paper. Further, it is desirable to access the intermediate data stored in respective band memories as continuous as possible. Accordingly, it is necessary to set a memory area for storing the intermediate data for respective bands of a document of one page.

However, in the conventional method for setting each memory area for storing the intermediate data in the intermediate data storing memory after dividing the whole memory area into the same area for each band, in the case of a document where image data are deviated to one side, the intermediate data of a band having much print data can not be stored therein. Further, in the case of a band having little print data or no print data, there is caused such a state that a memory area larger than that necessary for storing the intermediate data is set or established therein. If a memory area larger than that necessary for storing the intermediate data is set or established therein, the efficiency upon using the memory is lowered. Therefore, it is necessary to provide a method for setting a large memory area when necessary in the case of a band having much print data, in order to manage the data more efficiently. However, in a method for increasing the storing memory area every one unit of data, it takes a long time to retrieve the storing memory area within the whole memory.

Further, in a method for printing dot image data utilizing the band memories, in the case of printing plural documents on a piece of printing paper such as the both sides printing, or in the case of returning from a paper jam, the time permissible for editing the document may be limited in the view of the time necessary for printing plural documents. In order to solve the above-mentioned these problems completely, it is necessary to edit data of necessary plural documents such as documents of two pages in the case of the both sides printing prior to outputting the dot image data to the print head section. Therefore, it is necessary to manage the intermediate data of plural documents.

SUMMARY OF THE INVENTION

In order to solve the above-mentioned these problems, an essential object of the present invention is to provide a print data processing apparatus for an image forming apparatus which is capable of efficiently storing intermediate data converted for developing print data into dot image data, when a document of one page is virtually divided into plural bands and print data received from a host computer are edited.

Another object of the present invention is to provide a print data processing apparatus for an image forming apparatus which is capable of easily managing intermediate data when it is necessary to manage plural documents, when a document of one page is virtually divided into plural bands and print data received from a host computer are edited.

A further object of the present invention is to provide a print data processing apparatus for an image forming apparatus which is capable of preventing an error caused due to the lack of the memory capacity of a intermediate data storing memory, when it is necessary to edit intermediate data of plural documents, upon utilizing a method for changing an intermediate data storing area in the intermediate data storing memory.

In order to accomplish the above objects, according to one aspect of the present invention, there is provided a print data processing apparatus for an image forming apparatus for receiving print data from an external unit, converting said received print data into dot image data at every one of bands defined by dividing an image area of one page, and outputting said dot image data to a printer so as to form all the image of one page corresponding to said print data on a piece of printing paper, comprising:

analysis means for sequentially analyzing print data received from said external unit and converting said print data into intermediate data;

first storage means for storing said intermediate data converted by said analysis means;

register means for judging which band said intermediate data stored by said first storage means belong to, and registering judged band information of said intermediate data in a band table of a further storage means;

development means for developing said intermediate data into dot image data every band referring to said band information registered in said band table;

second storage means for storing said dot image data developed by said development means; and output means for outputting said dot image data stored by said second storage means to said printer.

According to another aspect of the present invention, there is provided a print data processing apparatus for an image forming apparatus for receiving print data from an external unit, converting said received print data into dot image data at every one of bands defined by dividing an image area of one page, and outputting said dot image data to a printer so as to form all the image of one page corresponding to said print data on a piece of printing paper, comprising:

analysis means for sequentially analyzing print data received from said external unit and converting said print data into intermediate data;

first storage means for storing said intermediate data converted by said analysis means, said first storage means comprising plural first memory areas for respective bands, each first memory area having a predetermined memory capacity;

memory area setting means for setting in said first storage means a second memory area for storing said intermediate data therein when the amount of said intermediate data included in one band is larger than said memory capacity of said first memory area corresponding to said band;

register means for judging which band said intermediate data stored in said second memory area of said first storage means belong to, and registering judged band information of said intermediate data in a band table of a further storage means;

development means for developing said intermediate data included in the same band into dot image data included in said same band every band referring to said band information registered in said band table;

second storage means for storing said dot image data developed by said development means; and output means for outputting said dot image data stored by said second storage means to said printer.

According to a further aspect of the present invention, there is provided a print data processing apparatus for an image forming apparatus for receiving print data from an external unit, converting said received print data into dot image data at every one of bands defined by dividing an image area of one page, and outputting said dot image data to a printer so as to form all the image of one page corresponding to said print data on a piece of printing paper, comprising:

analysis means for sequentially analyzing print data received from said external unit and converting said print data into intermediate data;

first storage means for storing said intermediate data converted by said analysis means, said first storage means comprising plural first memory areas for respective bands, each first memory area having a predetermined memory capacity;

first memory area setting means for setting in said first storage means a second memory area having a predetermined memory capacity for storing said intermediate data therein when the amount of said intermediate data included in one band is larger than said memory capacity of said first memory area corresponding to said band;

second memory area setting means for setting in said first storage means another second memory area having the same memory capacity as that of said second memory area for storing said intermediate data therein when the amount of said intermediate data included in one band is larger than said memory capacity of said second memory area;

register means for judging which band said intermediate data stored in said memory areas set by said first and second memory area setting means belong to, and registering judged band information of said intermediate data in a band table of a further storage means;

development means for developing said intermediate data included in the same band into dot image data included in said same band every band referring to said band information registered in said band table;

second storage means for storing said dot image data developed by said development means; and output means for outputting said dot image data stored by said second storage means to said printer.

According to a still further aspect of the present invention, there is provided a print data processing apparatus for an image forming apparatus for sequentially receiving print data of documents of plural pages from an external unit, converting said received print data into dot image data at every one of bands defined by dividing an image area of a document of one page, and outputting said dot image data to a printer so as to form all the image of of the document of one page corresponding to said print data on a piece of printing paper, comprising:

analysis means for sequentially analyzing print data received from said external unit and converting said print data into intermediate data;

first storage means for storing said intermediate data converted by said analysis means;

register means for registering therein information of the document and the band to which said intermediate data stored in said first storage means belong;

development means for developing said intermediate data into dot image data every band referring to said information registered by said register means;

second storage means for storing said dot image data developed by said development means; and output means for outputting said dot image data stored by said second storage means to said printer.

According to a still more further aspect of the present invention, there is provided a print data processing apparatus for an image forming apparatus for sequentially receiving print data of plural documents from an external unit, converting said received print data into dot image data at every one of bands defined by dividing an image area of one page, and outputting said dot image data to a printer so as to form all the image of one page corresponding to said print data on a piece of printing paper, comprising:

analysis means for sequentially analyzing print data received from said external unit and converting said print data into intermediate data;

first storage means for storing said intermediate data converted by said analysis means;

register means for registering therein information of the document and the band to which said intermediate data stored in said first storage means belong;

development means for developing said intermediate data into dot image data every band from a predetermined document referring to said information registered by said register means;

second storage means for storing said dot image data developed by said development means;

output means for outputting said dot image data stored by said second storage means to said printer;

stop means for stopping the operation of said analysis means when there becomes no empty memory area in said first storage means;

judgment means for judging whether or not the number of the documents whose intermediate data have been already converted by said analysis means is equal to or larger than a predetermined number of the documents to be printed continuously when the operation of said analysis means is stopped by said stop means;

wait means for enabling said development means to perform said development process and waiting until there is caused an empty area in said first storage means when it is judged by said judgment means that the number of the documents whose intermediate data have been already converted by said analysis means is equal to or larger than a predetermined number of the documents to be printed continuously; and cancel means for disabling said stop means to stop the operation of said analysis means when there is caused an empty area in said first storage means after said wait means waits.

BRIEF DESCRIPTION OF THE DRAWINGS

These and other objects and features of the present invention will become clear from the following description taken in conjunction with the preferred embodiment thereof with reference to the accompanying drawings, in which:

FIG. 6 is a schematic diagram showing a composition of packet data;

FIG. 7 is a schematic diagram showing a cell map;

FIG. 8 is a schematic diagram showing a memory map of the video buffer memory shown in FIG. 1;

FIG. 9 is a diagram showing an address table of the video buffer memory shown in FIG. 1;

FIG. 12 is a diagram showing respective packet management data stored in the packet management B table shown in FIG. 11;

FIG. 13 is a diagram showing a whole management C table;

DETAILED DESCRIPTION OF THE PREFERRED EMBODIMENT

A printer controller of a preferred embodiment according to the present invention will be described below in an order of the following items with reference to the attached drawings.
(a) Composition of Printer controller
(b) Conversion into intermediate data and Data management system
(c) Control flow of Edit controller etc.

(a) Composition of Printer controller

Figure 1:
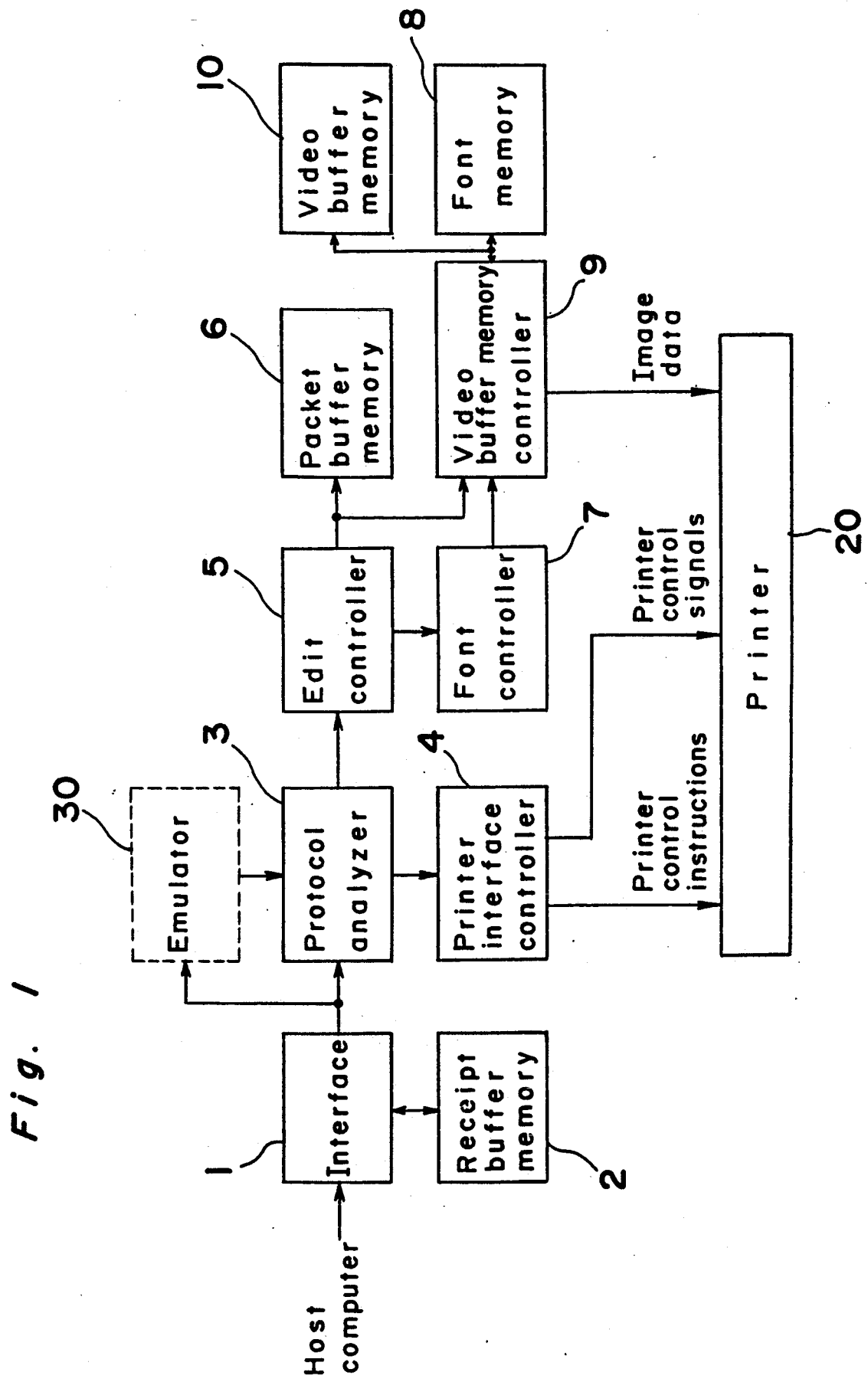
FIG. 1 is a block diagram showing a composition of a printer controller of a preferred embodiment according to the present invention.

FIG. 1 shows a composition of a printer controller of a preferred embodiment according to the present invention.

Referring to FIG. 1, the printer controller of the preferred embodiment comprises an interface 1, a receipt buffer memory 2, a protocol analyzer 3, a printer interface controller 4, an edit controller 5, a packet buffer memory 6, a font controller 7, a font memory 8, a video buffer memory controller 9 and a video buffer memory 10.

The interface 1 receives data such as protocol data from an external unit such as a host computer, an image reader, and then, transfers them to the receipt buffer memory 2 which is provided for storing data received from the external unit. The protocol analyzer 3 analyzes received data which are transferred from the receipt buffer memory 2 through the interface 1 so as to identify printer interface control commands, print data etc., and then, outputs the printer interface control commands to the printer interface controller 4, and outputs the print data to the edit controller 5. The printer interface controller 4 outputs printer control instructions and printer control signals to a printer 20 so as to control a printing sequence of a printer 20 which prints dot image on a piece of printing paper in the electrophotographic process, and performs various kinds of displays on light emitting diodes (referred to as LEDs hereinafter) of an operation panel (not shown).

The edit controller 5 calculates a position of a cursor from the received data such as the print data, and then, assembles packet data (intermediate code) composed of information of characters etc. such as the size thereof, the source address etc., and sends the assembled packet data to the packet buffer memory 6. In the present preferred embodiment, the character generation for the printer 20 is controlled by the edit controller 5. The font controller 7 manages a ROM font and a down-loaded font which are stored in the font memory 8. The video buffer memory controller 9 controls the operation of the video buffer memory 10, and also develops packet data into dot image data on the video buffer memory 10 of a bit map memory for storing dot image data therein according to the packet data stored in the packet buffer memory 6.

The protocol data received from the external unit such as the host computer, the image reader are classified into character data, graphic data, down-loaded data (font) and control commands.

Figure 2:
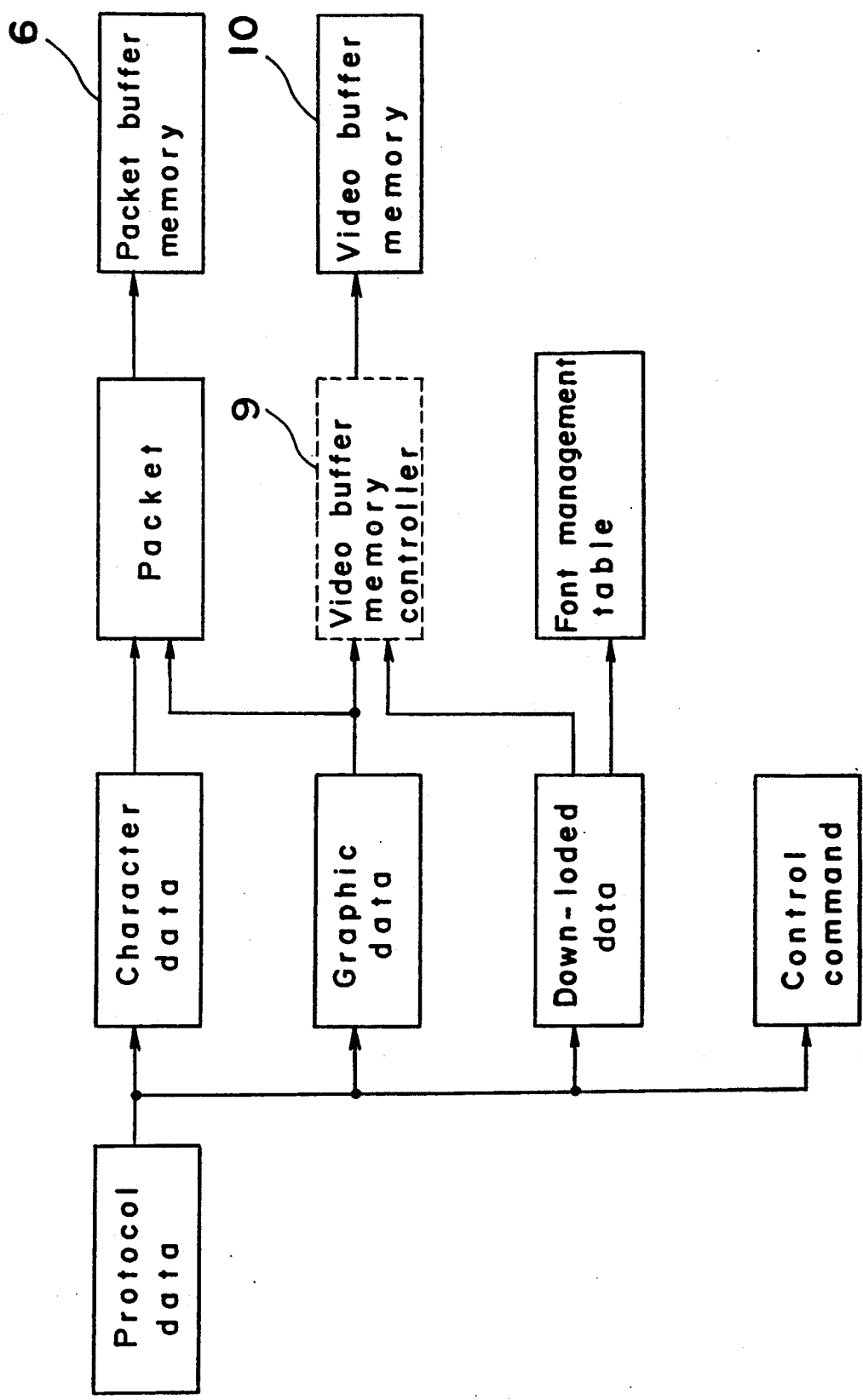
FIG. 2 is a schematic block diagram showing data flows which are processed in the printer controller shown in FIG. 1.

FIG. 2 shows data flows of these protocol data to be processed in the printer controller shown in FIG. 1.

Referring to FIG. 2, upon processing the character data in the printer controller, packet data are assembled based on a storage address of bit map data corresponding to the character code and a virtual address on a piece of printing paper corresponding to the printing position, and then, the assembled packet data are stored in the packet buffer memory 6.

The graphic data are classified into vector graphic data and raster graphic data. The graphic data are transferred from the edit controller 5 through the video buffer memory controller 9 to the video buffer memory 10 so as to store them therein. The edit controller 5 assembles packet data based on the address of the video buffer memory 10 at which the graphic data are stored and the address of the printing position, and stores the assembled packet data in the packet buffer memory 6.

The down-loaded data of a font are transferred from the edit controller 5 through the video buffer memory controller 9 to the video buffer memory 10 so as to stored them therein. Further, data for managing the font stored in the video buffer memory 10 are stored in a font management table.

Among the control commands, the commands for controlling the printer 20 are sent through the protocol analyzer 3 and the printer interface controller 4 to the printer 20, and the other commands are set as the internal parameters.

(b) Conversion into intermediate data and Data management system

Figure 3:
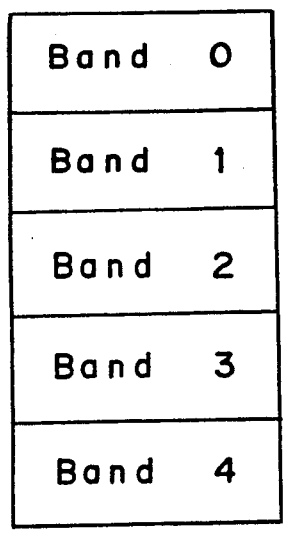
FIG. 3 is a schematic diagram showing a document of one page which is divided into five bands.

In the data management system of the present preferred embodiment, the documents can be managed up to six documents. The image data received from the external unit such as the host computer are converted or edited into the packet data of the intermediate data, as described later, and then, the assembled packet data are stored in the packet buffer memory 6. Normally, after the packet data of the document of one page are stored in the packet buffer memory 6, the packet data are converted into bit image data, and then, the converted bit image data are stored in the video buffer memory 10. The document of one page is virtually divided into five bands in a subscan direction parallel to a direction of feeding a piece of printing paper as shown in FIG. 3, and the write process and the read process of the bit image data are performed sequentially in a unit of the band. The video buffer memory 10 is not a bit map memory of one page. The video buffer memory 10 has two memory areas, each memory area having a memory capacity of 1/5 page of a document. The write process and the read process are performed alternately and repeatedly in the two memory areas of the video buffer memory 10.

Figure 4:
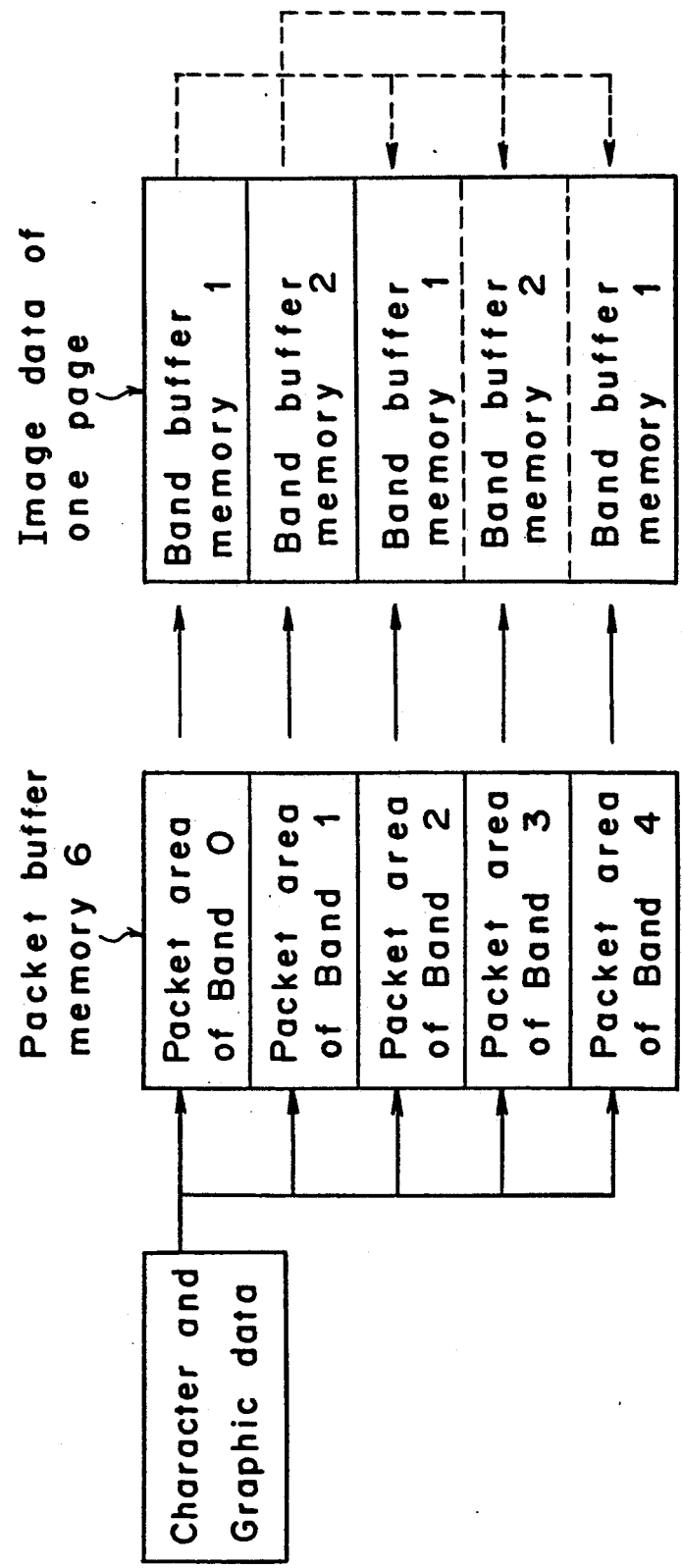
FIG. 4 is a schematic block diagram showing a process in which character and graphic data are developed into bit image data on a video buffer memory shown in FIG. 1.

Since the document of one page is virtually divided into five bands and the write process and the read process of the bit image data are performed therein, the bit image data are printed on a piece of printing paper from the top thereof. In order to print the character data and the graphic data thereon, it is necessary to preedit the print data of one page, normally. Therefore, the print data of one page are converted into the packet data, and then, the packet data are stored in the packet buffer memory 6. While the print process is performed in a unit of a band, the packet data are stored in a unit of the band, as shown in FIG. 4. Thereafter, after the edit process into the packet data of one page is completed, the packet data are developed into the dot image data from the head band thereof sequentially on two band buffer memories, alternately.

The conversion from the character data and the raster graphic data into the packet data is performed continuously in a predetermined direction. However, for example, in the case of a straight line, there may be vector graphic data over two bands, and then, the vector graphic data may be stored in plural packet areas. Therefore, the development of the packet data is not always performed in an order of the bands. As described later, since the graphic data are stored in a unit of a cell which is a small unit within each band, the vector graphic data such as data of a straight line included in plural bands are converted into packet data so as to correspond to plural cells of plural bands, and the converted packet data are stored in the related packet area.

Upon writing the packet data in the packet buffer memory 6, the packet data are stored in the packet area provided every band. Since the number of characters to be written in one band is not constant, if the memory capacity of the packet area per band is fixed, the efficiency upon using the packet buffer memory 6 is lowered. Therefore, first of all, there are set or established for each band, an area for storing the packet data having only a minimum memory capacity necessary for managing the data such as a memory capacity of two characters. If the characters having a capacity larger than the above-mentioned minimum memory capacity are written therein, there is added to the area having the minimum memory capacity a new extended packet data register area having a memory capacity of a predetermined large characters such as 200 characters, and further, another packet register area is set or established in a unit of a memory capacity of 200 characters. In the preferred embodiment, the memory capacity of two characters is set or established as the minimum capacity because of judgment of presence of data and because there is a possibility of a character located over plural bands.

Figure 5:
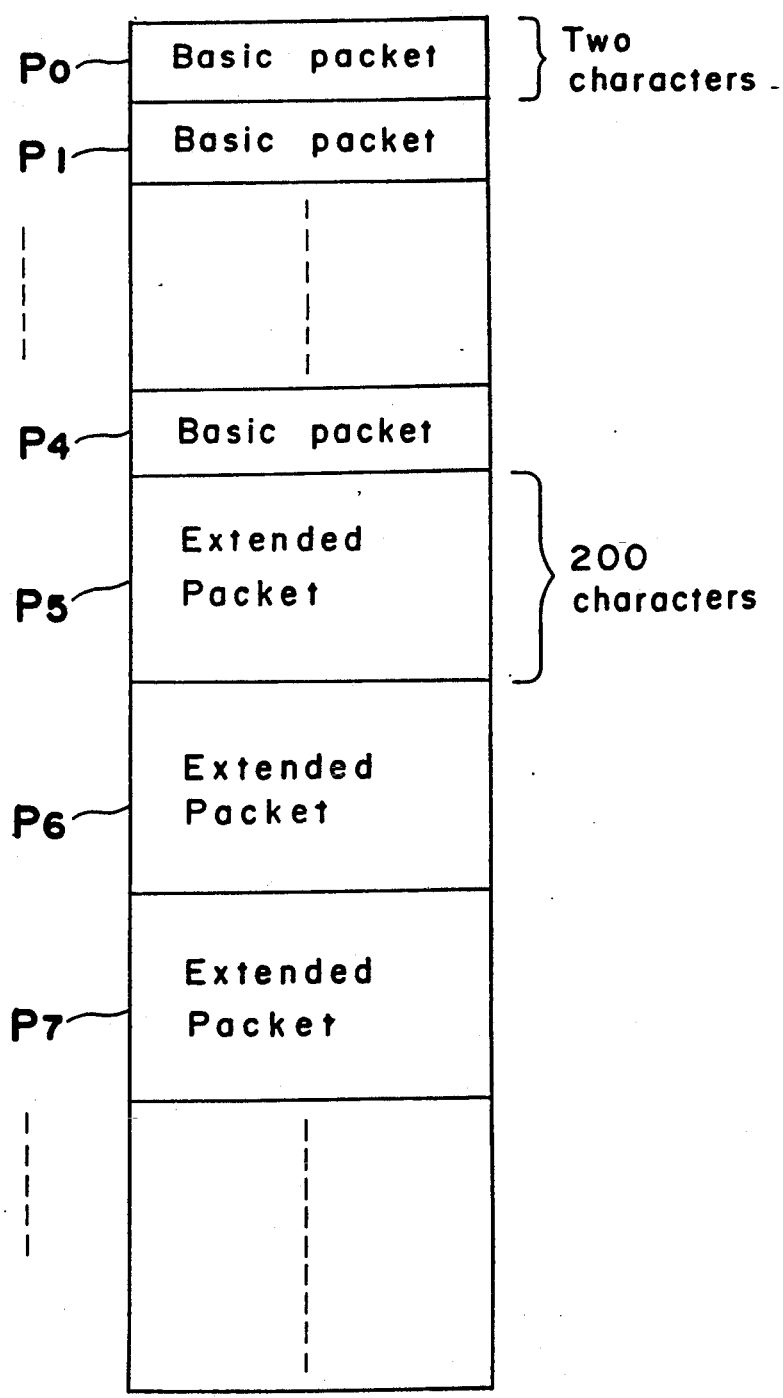
FIG. 5 is a schematic diagram showing a memory map of a packet buffer memory shown in FIG. 1.

Therefore, in the present preferred embodiment, as shown in FIG. 5, the packet area is divided into five basic packet areas $P_0$ to $P_4$ each basic packet area having a memory capacity of two characters, and many extended packet areas $P_5$, $P_6$, $P_7$, ... each extended packet area having a memory capacity of 200 characters. The basic packet areas $P_0$ to $P_4$ are preprovided for all the bands, however, the extended packet areas $P_5$, $P_6$, $P_7$, ... are additionally assigned, if necessary, in the case of data of three or more characters for each band.

FIG. 6 shows a composition of one packet data.

As shown in FIG. 6, one packet data are composed of four words. The one packet data comprises a source address (L) in the 0-th word, a cell width and a source address (H) in the 1st word, a flag 1 and a cell height in the 2nd word, and a video buffer memory address (L) in the 3rd word. In the one packet data, the source address is a head address of data to be stored in the video buffer memory 10, and the video buffer memory address is a head address (offset) of the video buffer memory 10 into which the dot image data are written. The cell width is a width of data to be stored in the video buffer memory 10, and the cell height is a height of data to be stored therein. Further, the flag 1 is a control flag (related to a source) of the video buffer memory controller 9.

The amount of data of one packet to be managed is one character in the case of character data, and is an area of 160 dots square (referred to as a cell hereinafter) in the case of raster graphic data.

The graphic data are stored in a graphic storing area of the video buffer memory 10 in a unit of a cell. As shown in FIG. 7, one cell is defined by dividing an area having a paper size specified by the external unit such as the host computer into 4×7 areas having a predetermined dimension, and serial numbers are given to respective cells.

FIG. 8 shows a memory map of the video buffer memory 10.

As shown in FIG. 8, the band buffer memory and the graphic storing area are provided on the same video buffer memory 10, and respective memory capacities of the band buffer memory and the graphic storing area change depending on the paper size and the print data. It is to be noted that the video buffer memory 10 is managed based on a management table, which is described later.

The graphic storing area is provided between a start pointer (GR_RASD_NAD) and a storing area end pointer (GR_RAS_BOT), wherein the start pointer is located at the last address of the video buffer memory 10, and the storing area end pointer and an end storing area of the corresponding document of the B table which is described later are updated every time a register area is set or established therein.

FIG. 9 shows an address table for registering linear addresses on the graphic storing area corresponding to the cells into which a document area is divided, each cell having a predetermined size.

The linear addresses stored in the address table shown in FIG. 9 correspond to respective cells on the cell map shown in FIG. 7, one by one. In the address table, data "00" are stored as the linear address of the cell whose register area is not set or established in the storing area.

As shown in the cell map of FIG. 7, when the cell number corresponding to the position of the absolute coordinates of the graphic data is "3", the relative address thereof on the video buffer memory 10 is calculated as shown in FIG. 8, and then, the register area of the cell "3" is set or established and data are stored therein. Further, the storing area end pointer (GR_RAS_BOT) is updated, and the linear address of the cell "3" is registered in the address table shown in FIG. 9 in responsive thereto. Furthermore, in the case of overwriting the cell which has been registered in the address table, an address value corresponding to the cell number is calculated so as to obtain the address at which data is to be stored in the video buffer memory 10.

When a graphic storing area is set or established on the video buffer memory 10, a packet is assembled for cell data to be registered on the video buffer memory 10. Namely, packet data of graphic data are processed in a unit of the cell. In the case of developing graphic data into dot image data on the band memory after assembling a packet, these processes are performed in a manner similar to that in the case of character data.

Figure 10:
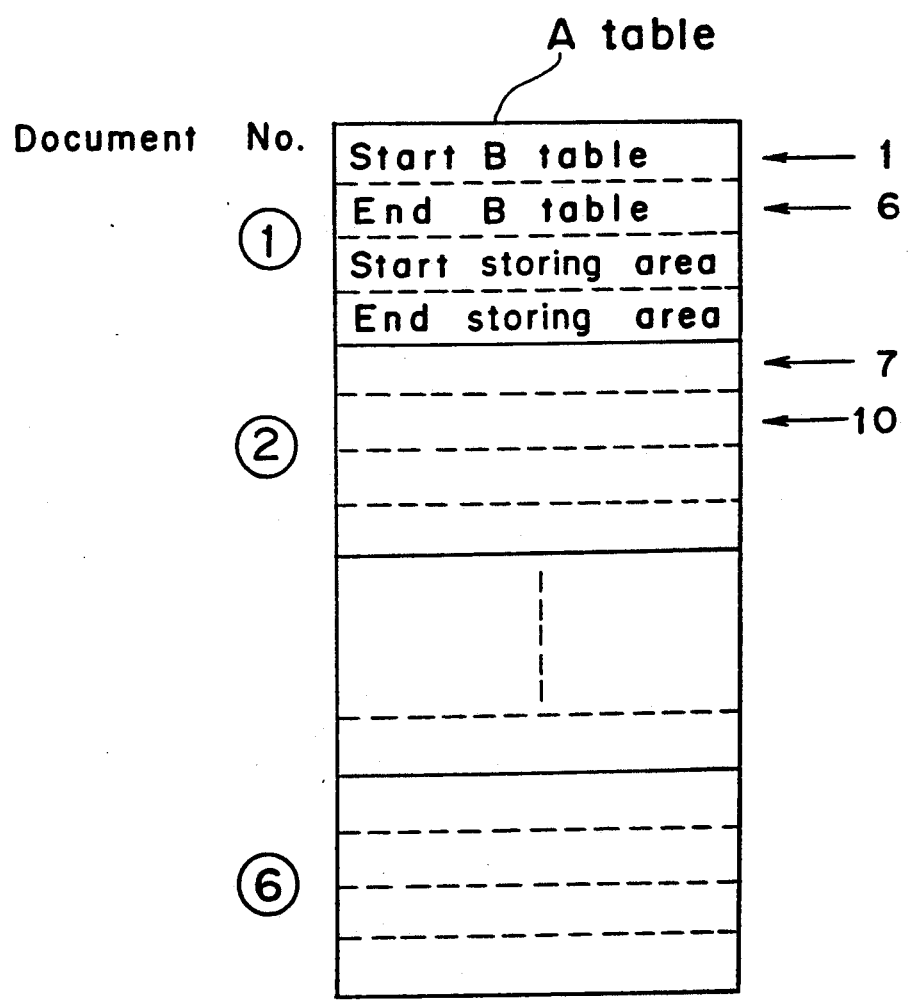
FIG. 10 is a diagram showing a document management A table.
Figure 11:
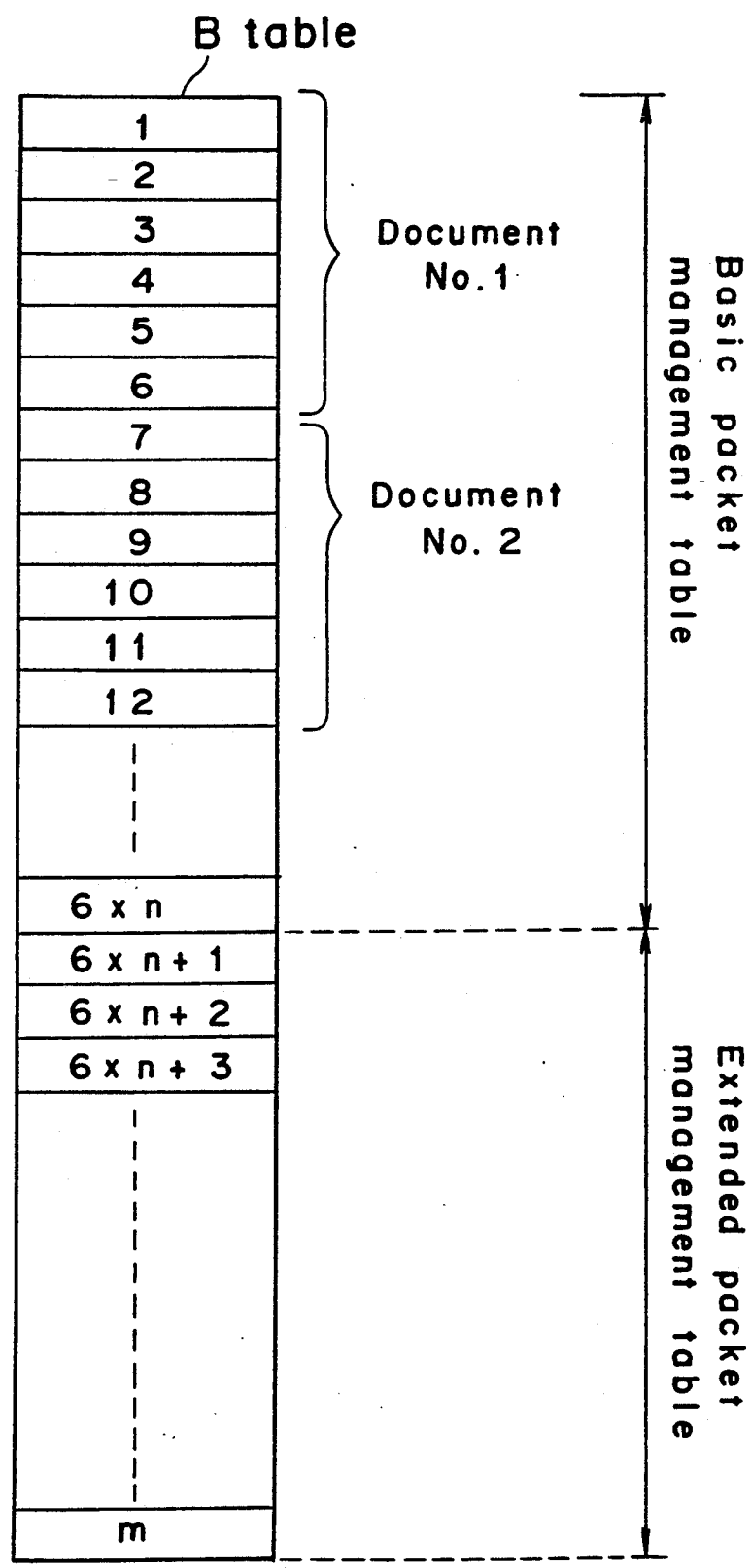
FIG. 11 is a diagram showing a packet management B table.

In order to manage documents, packet data and the graphic storing area, the edit controller 5 utilizes three tables; an A table shown in FIG. 10, a B table shown in FIG. 11 and a C table shown in FIG. 13.

The A table shown in FIG. 10 is a document management table for managing documents of plural pages necessary for storing image data in the printer 20. For each document, there are registered a start point and an end point of the B table for managing the numbers of the basic packets located from the top band 0 to the bottom band, and a start point and an end point of the graphic storing area which has been used with respect to the document thereof.

FIG. 11 shows the B table for managing the packet data to be stored in the packet buffer memory 6 (See FIG. 5), which is provided for documents of six pages.

Referring to FIG. 11, the B table is composed of a basic packet management table for managing the basic packet areas for the documents of six pages, and an extended packet management table for managing one or more extended packet areas which are added to the basic packet areas, if necessary.

FIG. 12 shows a composition of each packet management table.

For each band, in the packet management table, there are sequentially stored a current divided packet number (which is used only in the case of the basic packet) of a divided packet which is being used at present, a next divided packet number of a divided packet which is next used, a number of patterns stored at present, character specifications of each band, a head address and a segment of a packet, and an address and a segment of a packet which has been next used. If there becomes no available divided packet, the end code is stored as the current divided packet. If the packet is the end packet of the band data end, data of "00" are stored as the next divided packet number. The end of the current divided packet which is being used at present is detected by comparing data of the 1st word of the current divided packet with data of 2nd word thereof. Namely, the data of the 1st word of the current divided packet is compared with the data of the 2nd word thereof, and the end of the current divided packet is detected when the data of the 1st word thereof coincide with the data of the 2nd word thereof. In the printing process, upon outputting packet data to the video buffer memory controller 9, the current packet is taken over to the next packet according to the next divided packet number. The end data of each band is detected by counting the number of the patterns of the 1st word in the print process.

The C table shown in FIG. 13 is a whole management table for managing the documents, the packets and the storing areas. The C table is composed of an end page pointer for managing a document number which is detected upon a process end such as paper discharging, a current page pointer for managing a document number of the document which is processed upon editing or assembling the packet, a start pointer and an end pointer for managing the extended packet number of the extended packet which is being used at present, and a start pointer and an end pointer for managing a storing area address of the storing area which is being used at present. Therefore, the using extended packet area is managed by the managed document number and the managed document, and also the storing area of the graphic data is managed by the managed document.

(c) Control flow of Edit controller etc.

Figure 14A:
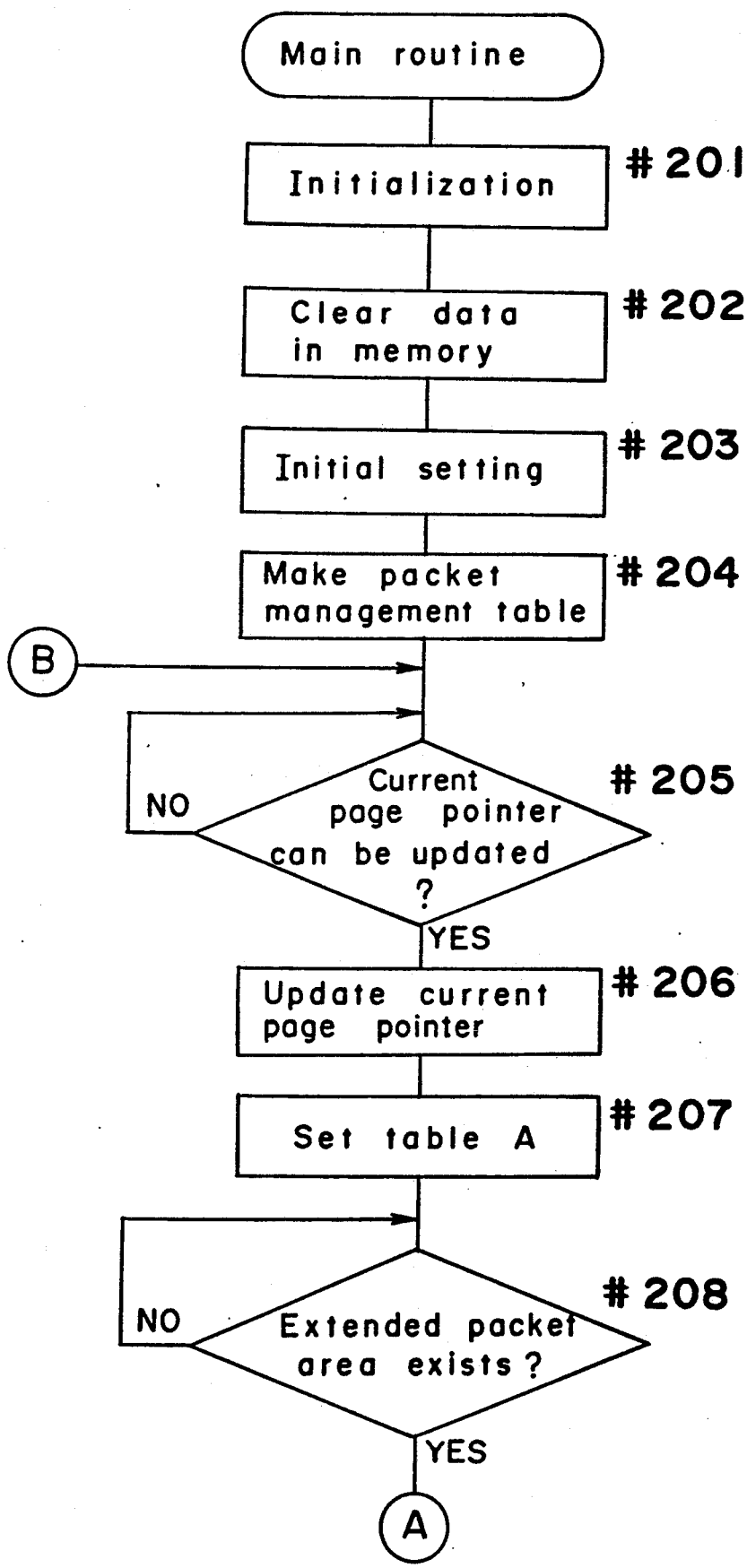
FIGS. 14a to 14c are flowcharts showing a main routine which is executed by an edit controller shown in FIG. 1.
Figure 14B:
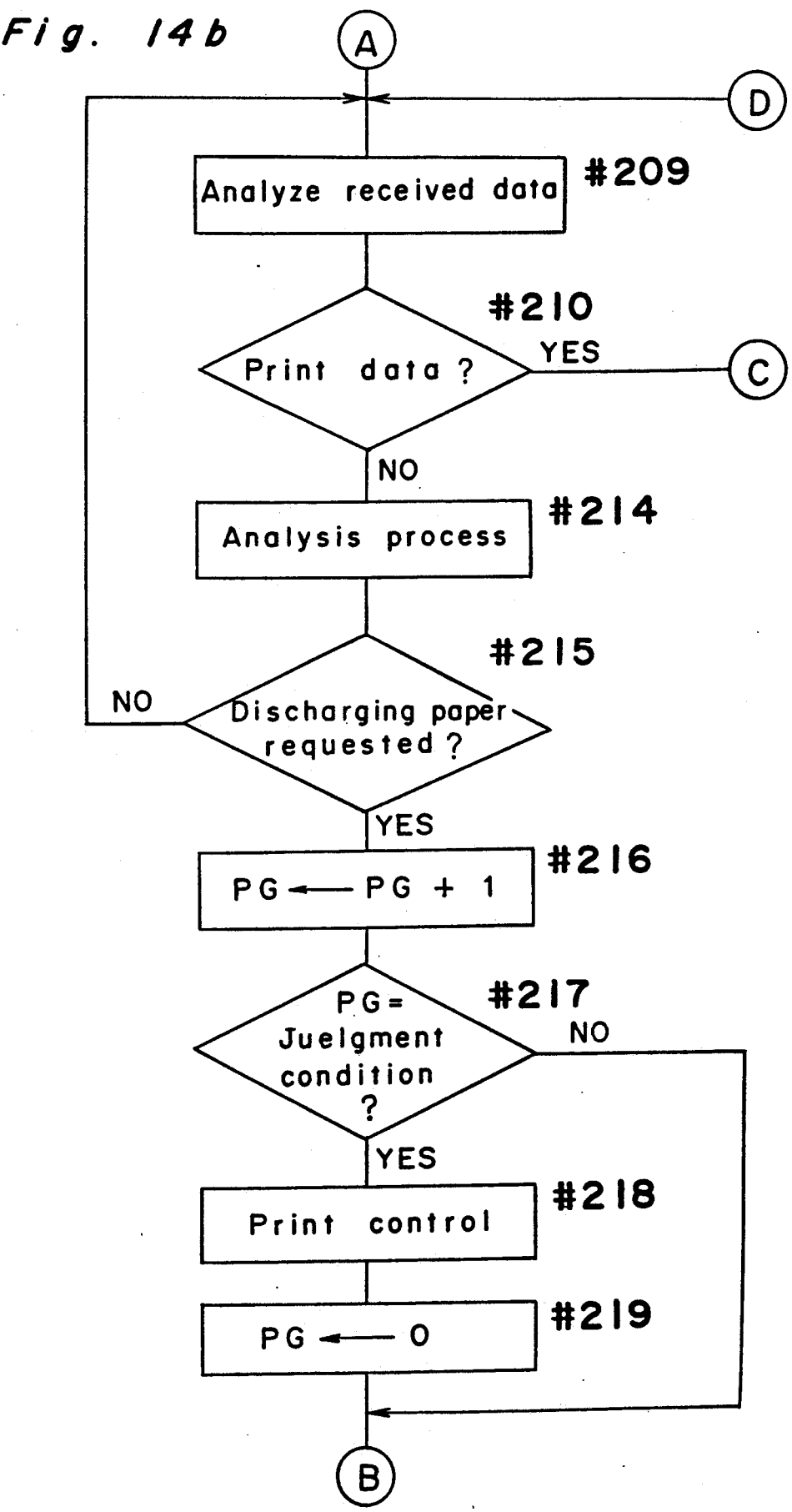
Figure 14C:
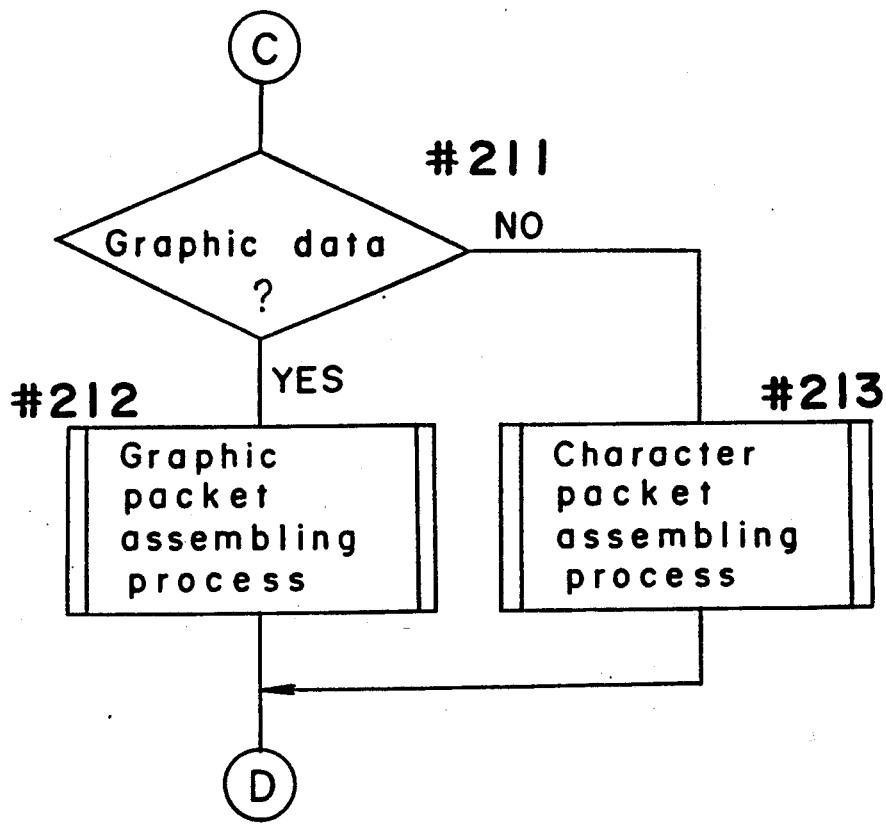

FIGS. 14a to 14c are flowcharts showing a main routine which is executed by the edit controller 5.

Referring to FIG. 14a, when a main switch of the printer controller is turned on, an initialization process is performed for a CPU of the edit controller 5 and the peripheral circuits thereof at step #201, and then, data stored in a RAM of the edit controller 5 which is used as a working area, the packet buffer memory 6 and the video buffer memory 10 are cleared at step #202.

Thereafter, an initial setting process is performed at step #203 according to the setting state of a dip switch (not shown) and a default, wherein a page counter PG value is reset to zero. Then, the A, B and C tables for managing the packet are initialized at step #204.

Thereafter, the initial setting process is performed for respective documents as follows. First of all, it is judged at step #205 whether or not there is a margin for the limitation of the maximum number of the managed documents which is predetermined by the fundamental performance of the printer controller, wherein the maximum number of the managed documents is six in the present preferred embodiment. Namely, it is judged at step #205 whether or not the current page pointer can be updated. If the current page pointer can not be updated (No at step #205), the edit controller 5 waits until the process of the documents which are being managed is completed. If the current page pointer can be updated or the edit process of data received from the external unit such as the host computer can be started (Yes at step #205), the current page pointer of the C table is updated at step #206, and then, there are set the parameters of the corresponding document of the A table such as the start B table, the end B table and the start storing area at step #207. Thereafter, it is judged at step #208 whether or not there is an empty extended packet area in the packet buffer memory 6. If there is no empty extended packet area in the packet buffer memory 6 (No at step #208), the edit controller 5 waits until there is caused an empty extended packet area. On the other hand, if there is an empty extended packet area in the packet buffer memory 6 (Yes at step #208), the program flow goes to step #209.

Figure 15:
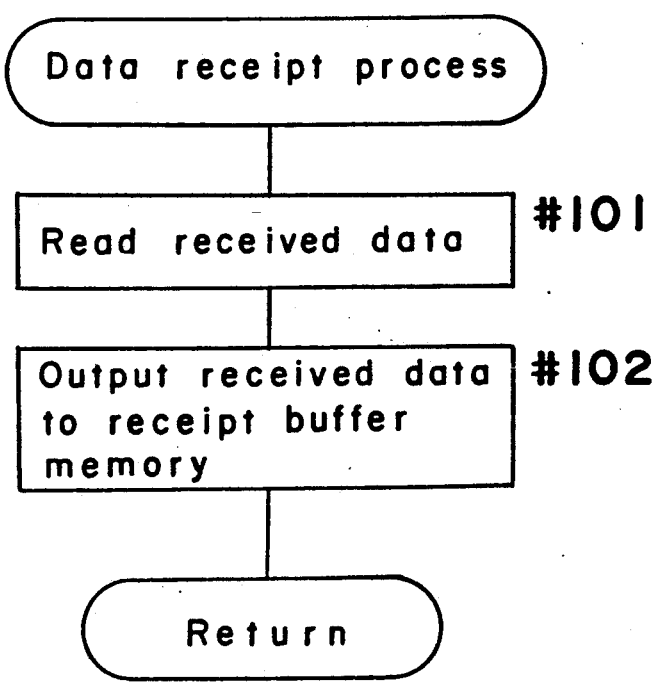
FIG. 15 is a flowchart showing a data receipt process which is executed by an interface shown in FIG. 1.

FIG. 15 is a flowchart showing a data receipt process which is executed by the interface 1.

Referring to FIG. 15, the interface 1 receives data from the external unit such as the host computer in asynchronous with the operation of the edit controller 5 at step #101, and then, the received data are transferred to the receipt buffer memory 2 so as to store them therein at step #102.

Referring back to FIG. 14b, the received data stored in the receipt buffer memory 2 are read out and analyzed at step #209. Thereafter, it is judged at step #210 whether or not the received data are print data. If the received data are print data (Yes at step #210), it is judged at step #211 of FIG. 14c whether or not the received data are graphic data.

If the received data are graphic data (Yes at step #211), the program flow goes to step #212 of FIG. 14c, and then, there is executed a graphic packet assembling process for assembling a graphic packet, and the program flow goes back to step #209. On the other hand, if the received data are not graphic data or the received data are character data (No at step #211), the program flow goes to step #213 of FIG. 14c, and then, there is executed a character packet assembling process for assembling a character packet, and the program flow goes back to step #209.

On the other hand, if the received data are not print data or the received data are a control command (No at step #210), the received control command is analyzed and a control process corresponding to the control command is performed at step #214. Thereafter, it is judged at step #215 whether or not the received data are paper discharging command or discharging a piece of printing paper is requested. If discharging a piece of printing paper is not requested (No at step #215), the program flow goes back to step #209, and then, the received data are analyzed.

On the other hand, if discharging a piece of printing paper is requested (Yes at step #215), the page counter PG is incremented by one at step #216, and then, it is judged at step #217 whether or not the value of the page counter PG conforms to a judgment condition for judging whether or not a continuous process is to be performed, such as two in the case of the both sides copying process. If the value of the page counter PG does not conform to the above-mentioned judgment condition (No at step #217), the program flow goes back to step #205, and then, data of the next document are processed.

On the other hand, if the value of the page counter PG conforms to the above-mentioned judgment condition (Yes at step #217), the program flow goes to step 218, and then, the printer 20 is started, and also the edit controller 5 performs a print control process. Namely, the edit controller 5 develops the received print data into dot image data on the band buffer memory, and also outputs the developed dot image data to the printer 20. Thereafter, the value of the page counter PG is reset to zero at step #219, and then, the program flow goes back to step #205, and data of the next document are processed.

Figure 16:
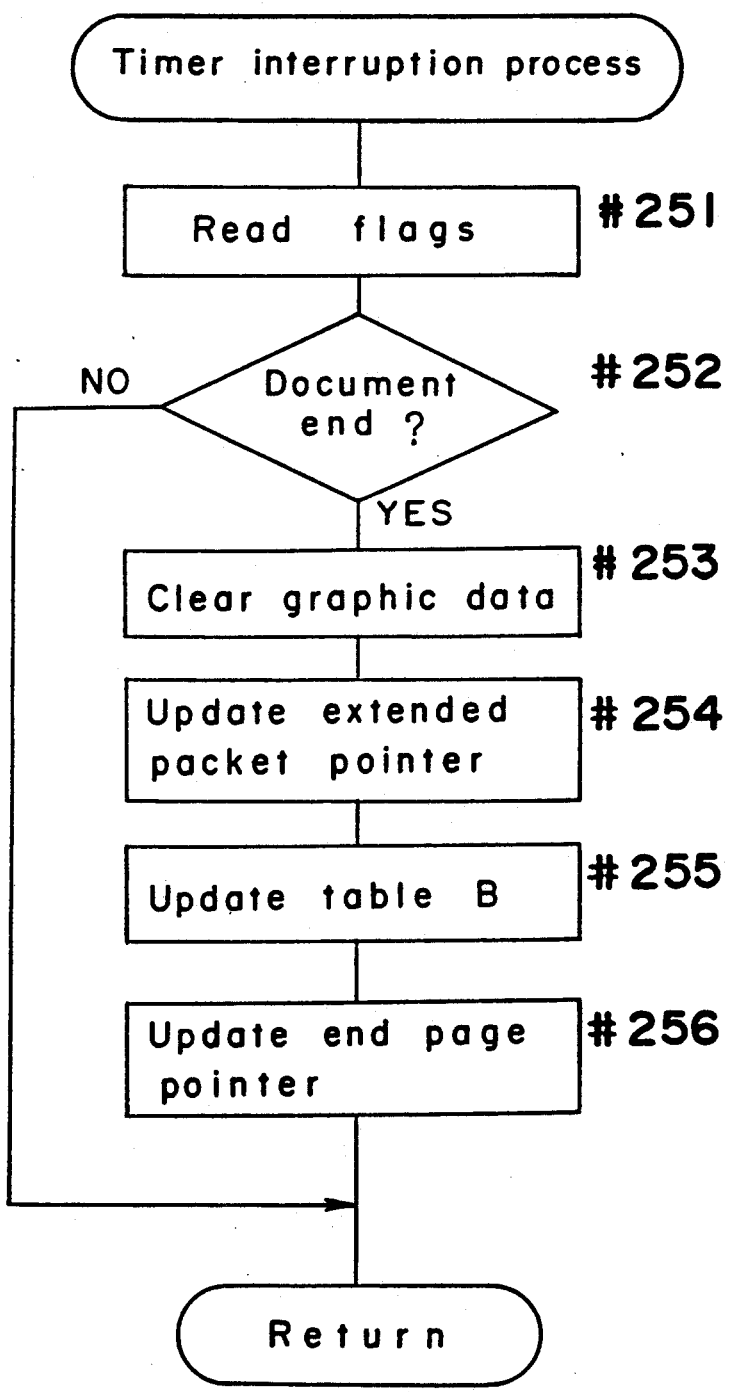
FIG. 16 is a flowchart showing a timer interruption process which is executed by the edit controller shown in FIG. 1.

FIG. 16 is a flowchart showing a timer interruption process which is executed periodically every predetermined time interval by the edit controller 5. In the timer interruption process, the parameters to be judged at steps #205 and #208 of FIG. 14a are updated.

Referring to FIG. 16, first of all, various kinds of flags such as an error occurance flag are read in at step #251, and then, it is judged at step #252 whether or not the end of the document is detected. If the end of the document is detected (Yes at step #252), the graphic data stored in the video buffer memory 10 are cleared at step #253, the extended packet pointer of the C table is updated at step #254, the corresponding document section of the B table is cleared at step #255, and the end page pointer of the C table is updated at step #256. Thereafter, the program flow returns to the main routine.

On the other hand, if the end of the document is not detected (No at step #252), the program flow returns to the main routine, directly.

Figure 17:
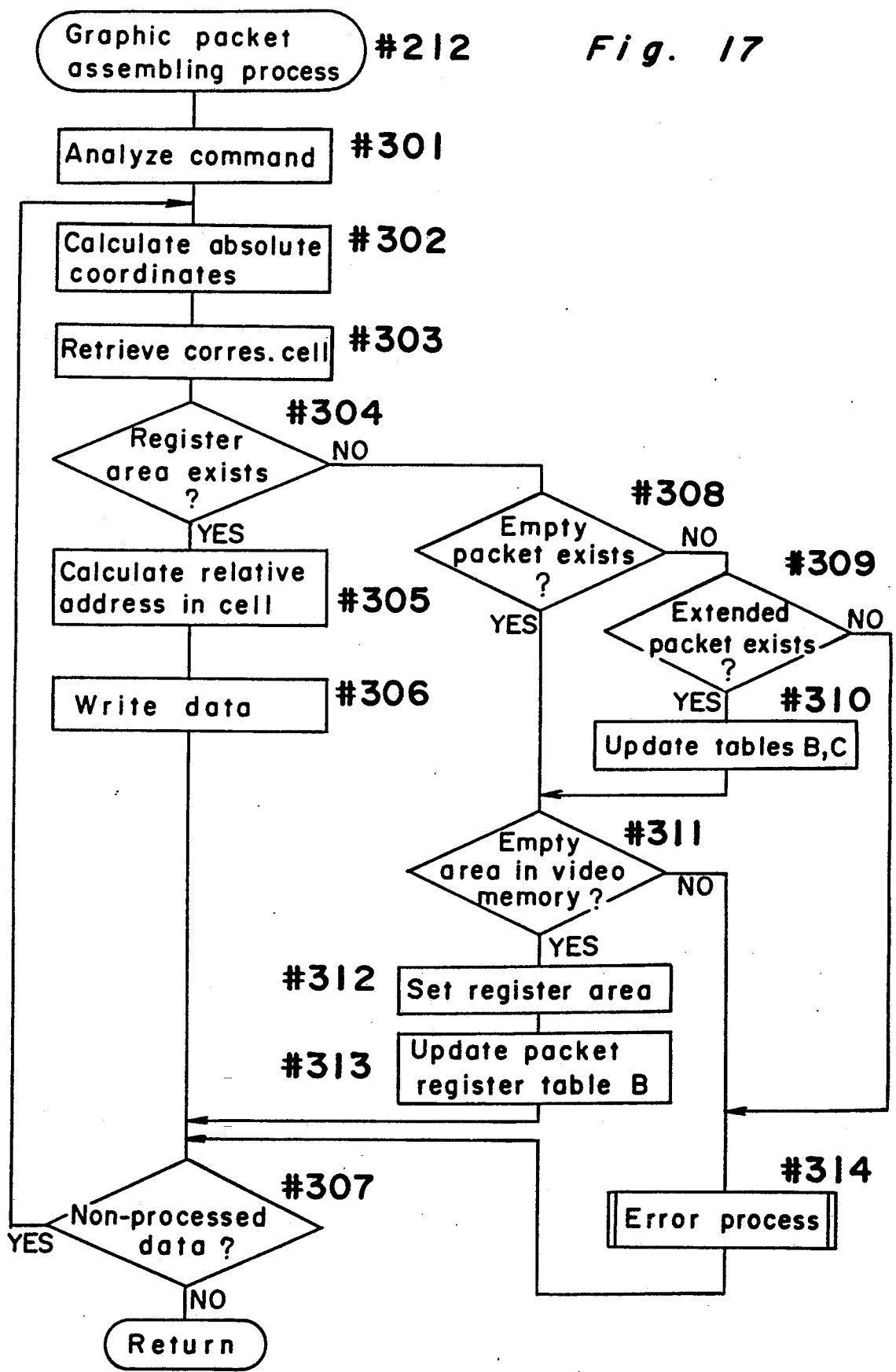
FIG. 17 is a flowchart showing a graphic packet assembling process of a subroutine which is executed by the edit controller shown in FIG. 1.

FIG. 17 is a flowchart showing the graphic packet assembling process (step #212 of FIG. 14c) of a subroutine which is executed by the edit controller 5.

In the printer controller of the present preferred embodiment, a document of one page is divided by a predetermined line number n in the subscan direction, and the printer controller comprises two bit map memories or two band buffer memories, each memory having a memory capacity of the n lines. The data to be printed every band are temporarily edited so as to assemble a packet data, and the assembled packet data are stored in the packet buffer memory 6. The assembled packet has a composition similar to that of the character packet shown in FIG. 6. The graphic data are classified to the vector graphic data and the raster graphic data. The vector graphic data and the raster graphic data are transmitted from the external unit such as the host computer to the printer controller in the following formats, respectively.

(a) The vector graphic data

<Drawing instruction command such as a straight line, a circle> + <Parameters such as the coordinates, the size>

(b) The raster graphic data

<Commands> + <Data length> + <One line raster data>

Referring to FIG. 17, first of all, a command analysis process is executed at step #301. Thereafter, the absolute coordinates of each dot on a document of one page are calculated when the graphic image is developed into the dot image data at step #302, and then, a cell corresponding to the calculated coordinates is retrieved from the cell map at step #303. Thereafter, it is judged at step #304 whether or not a register area corresponding to the retrieved cell is set or established in the storing area (See FIG. 8) which is provided in the same memory 10 as the band buffer memory. If the register area is set or established therein (Yes at step #304), the relative address within the corresponding cell is calculated at step #305, and the dot image data are stored in the storing area of the video buffer memory 10 at step #306. Thereafter, the program flow goes to step #307.

On the other hand, if there is no register area (No at step #304), it is judged at step #308 whether or not there is an empty packet which is an empty of the memory in the basic packet area and the extended packet area which has been already assigned, and then, it is judged at step #309 whether or not there is an empty extended packet area. If there is no empty packet (No at step #308) and there is no extended packet area (No at step #309), there is executed an error process at step #314 (See FIG. 19), and then, the program flow goes to step #307, and the edit controller 5 waits until there is caused an empty packet or an extended packet area. On the other hand, if there is an empty packet (Yes at step #308), the program flow goes to step #311.

Further, if there is an empty extended packet area or an extended packet area can be set or established therein (Yes at step #309), the B and C tables are updated so as to assign an extended packet area at step #310, and then, the program flow goes to step #311.

In the case that a packet area to be registered can be set or established therein, the program flow goes to step #311, and then, an empty memory capacity of the video buffer memory 10 is checked or it is judged whether or not there is an empty memory area in the video buffer memory 10. If there is an empty memory area in the video buffer memory 10 (Yes at step #311), a register area is set or established in the video buffer memory 10 at step #312, and then, the program flow goes to step #313, the head address, the width and the height of the cell and the address upon the development are calculated so as to assemble a packet and to register the assembled packet therein, resulting in that the B table is updated. Thereafter, the program flow goes to step #307.

On the other hand, if there is no empty memory area in the video buffer memory 10 (No at step #311), the program flow goes to step #314, and then, the error process is executed. Thereafter, the program flow goes to step #307.

At step #307, it is judged whether or not there is non-processed data. If there is non-processed data (Yes at step #307), the program flow goes back to step #302, and then, the above-mentioned processes from step #302 to step #314 are repeated for non-processed data.

The stored packet data are developed into dot image data on the band buffer memory of the video buffer memory 10 through the video buffer controller 9, upon the print control process (step #218 of FIG. 14b). On the other hand, if there is no non-processed data (No at step #307), the program flow returns to the main routine.

Figure 18:
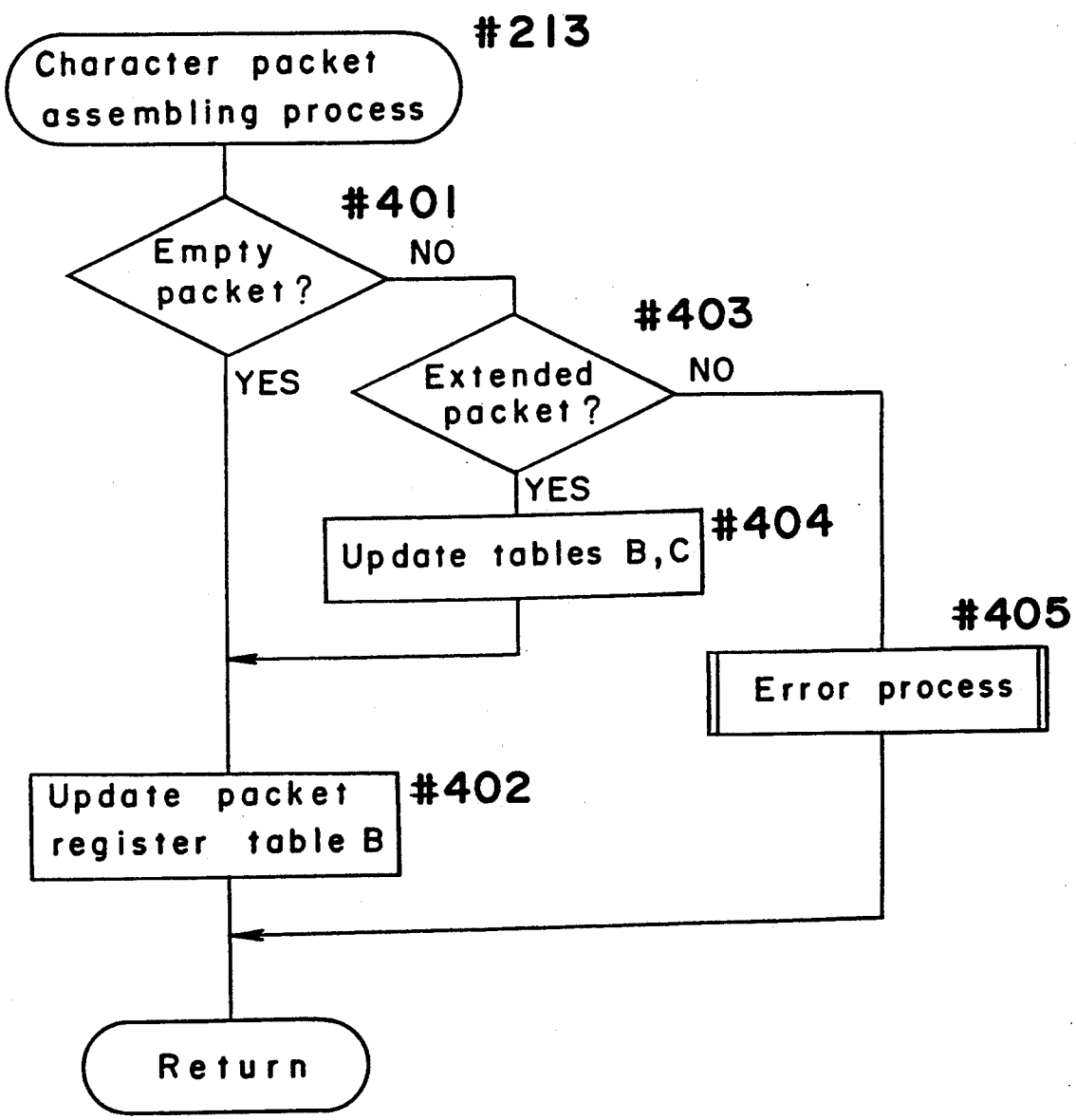
FIG. 18 is a flowchart showing a character packet assembling process of a subroutine which is executed by the edit controller shown in FIG. 1.

FIG. 18 is a flowchart showing the character packet assembling process (step #213 of FIG. 14c) of a subroutine which is executed by the edit controller 5.

In the printer controller of the present preferred embodiment, a document of one page is divided by a predetermined line number n in the subscan direction, and the printer controller comprises two bit map memories or two band buffer memories, each memory having a memory capacity of the n lines. The data to be printed every band are temporarily edited so as to assemble a packet data, and the assembled packet data are stored in the packet buffer memory 6.

Referring to FIG. 18, first of all, it is judged at step #401 whether or not there is an empty area in the packet area of the band corresponding to the cursor position. If there is an empty area in the packet area of the band corresponding to the cursor position (Yes at step #401), the program flow goes to step #402, the font address and the linear address are calculated in the case of developing the bit image data on the video buffer memory 10 so as to assemble a packet data and to register the assembled packet data in the packet area, and then, the B table which is the management table thereof is updated at step #402. Thereafter, the program flow returns to the main routine.

On the other hand, if there is no empty area therein (No at step #401), it is judged at step #403 whether or not there is an empty area of the extended packet area. If there is an empty area of the extended packet area (Yes at step #403), the program flow goes to step #404, the B and C tables are updated so as to assign an extended packet area for the band, and then, the program flow goes to step #402. On the other hand, if there is no empty area of the extended packet area (No at step #403), the program flow goes to step #405, the error process shown in FIG. 19 is executed, and then, the program flow returns to the main routine.

Figure 19:
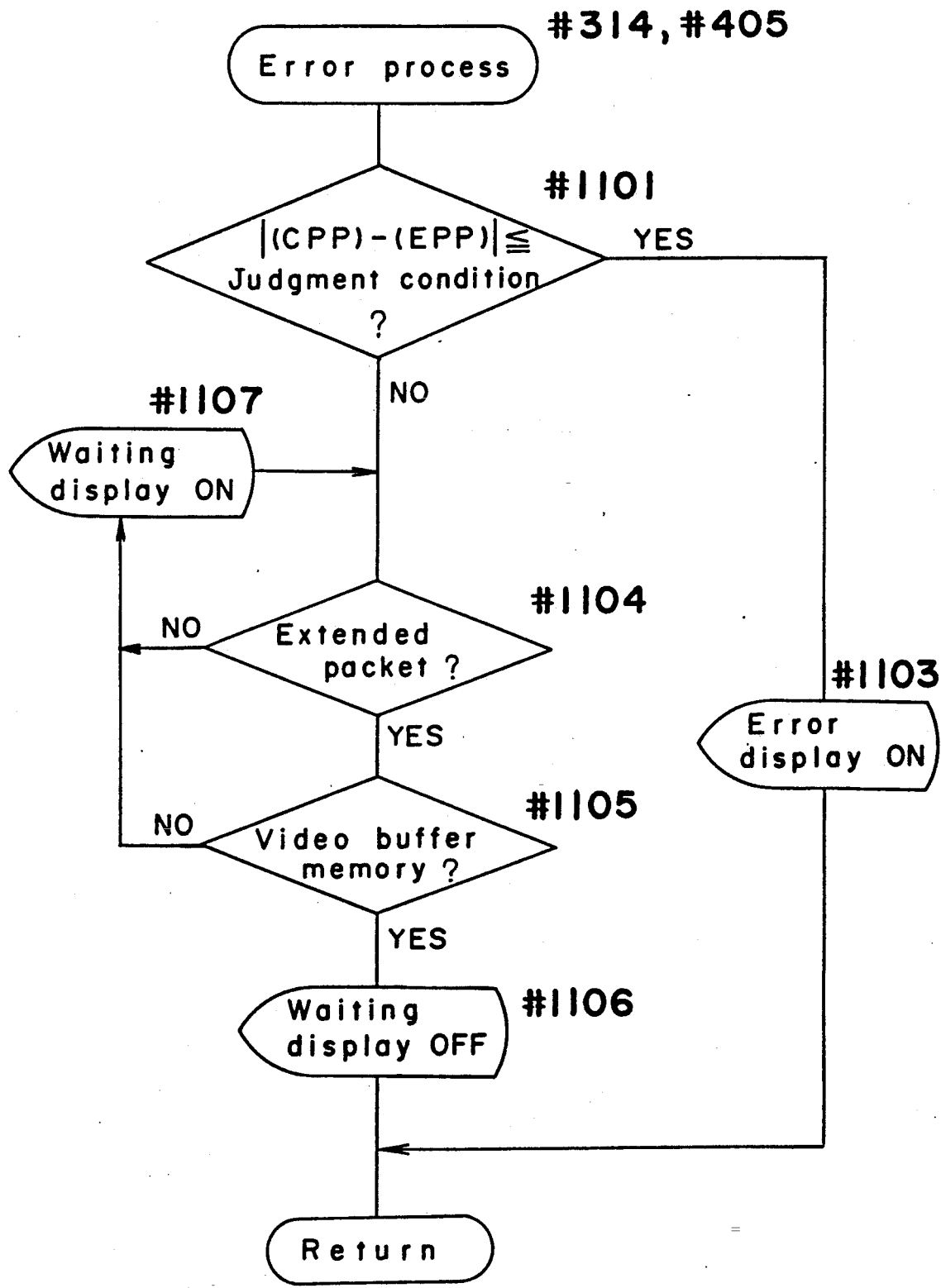
FIG. 19 is a flowchart showing an error process of a subroutine which is executed by the edit controller shown in FIG. 1.

FIG. 19 is a flowchart showing the error process (step #314 of FIG. 17 and step #405 of FIG. 18) of a subroutine which is executed by the edit controller 5 when there is caused the lack of the extended packet area and the video buffer memory 10 during the edit process.

In the initial setting process (step #203 of FIG. 14a) of the present preferred embodiment, for example, the number of pages when documents of plural pages are printed on a piece of printing paper by the printer 20 is set as a judgment condition for judging a continuous process. The above-mentioned judgment condition is determined depending on conditions such as the structure of the printer 20 etc. For example, in the case of the both sides printing process, the judgment condition is set at two.

Referring to FIG. 19, first of all, the difference between the current page pointer CPP which is the document number of the document which is being edited when an error occurs and the end page pointer EPP which is the document number of the document which has been already processed is equal to or smaller than the above-mentioned judgment condition, wherein the current page pointer CPP and the end page pointer EPP are stored in the C table. If the difference between the current page pointer CPP and the end page pointer EPP is equal to or smaller than the judgment condition (Yes at step #1101), it is judged that there is no empty area in the memory for editing the documents of plural pages for a piece of printing paper even though the edit process is not completed for the documents of plural pages to be processed continuously, and then, an error information for waiting is displayed on the operation panel at step #1103. Thereafter, the program flow returns to the original routine.

On the other hand, if the difference between the current page pointer CPP and the end page pointer EPP is larger than the judgment condition (No at step #1101), the edit controller 5 waits until there is caused an empty area in the extended packet buffer area or the video buffer memory 10 by discharging a piece of printing paper and updating the process end. Namely, it is judged at step #1104 whether or not there is an empty area in the extended packet area, and it is judged at step #1105 whether or not there is an empty area in the video buffer memory 10. If there is no empty area in the extended packet area or the video buffer memory 10 (No at step #1104 or #1105), the program flow goes to step #1107, such wait information that the edit controller 5 waits is displayed on the operation panel, and then, the program flow goes back to step #1104. On the other hand, if there is caused an empty area in the extended packet area or the video buffer memory 10 (Yes at both steps #1104 and #1105), the program flow goes to step #1106, the display of the wait information is turned off, and then, the program flow returns to the original routine.

As shown in FIG. 1, an emulator 30 may be provided between the interface 1 and the protocol analyzer 3.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A print data processing apparatus for an image forming apparatus for receiving print data from an external unit, converting said received print data into dot image data at every one of bands defined by dividing an image area of one page, and outputting said dot image data to a printer so as to form all the image of one page corresponding to said print data on a piece of printing paper, comprising:
   analysis means for sequentially analyzing print data received from said external unit and converting said print data into intermediate data;
   first storage means for storing said intermediate data converted by said analysis means, said first storage means comprising plural first memory areas for respective bands, each first memory area having a predetermined memory capacity;
   memory area setting means for setting in said first storage means a second memory area for storing said intermediate data therein when the amount of said intermediate data included in one band is larger than said memory capacity of said first memory area corresponding to said band;

register means for judging which band said intermediate data stored in said second memory area of said first storage means belong to, and registering judged band information of said intermediate data in a band table of a further storage means;

development means for developing said intermediate data included in the same band into dot image data included in said same band every band referring to said band information registered in said band table;

second storage means for storing said dot image data developed by said development means; and output means for outputting said dot image data stored by said second storage means to said printer.

2. The apparatus as claimed in claim 1, wherein said memory area setting means sets said second memory area having a memory capacity corresponding to the amount of said converted intermediate data.

3. The apparatus as claimed in claim 1, wherein said second storage means comprises at least two memories for storing and reading out said dot image data included in one band, alternately.

4. The apparatus as claimed in claim 3, wherein each of said two memories has a memory capacity capable of storing dot image data included in one band.

5. A print data processing apparatus for an image forming apparatus for receiving print data from an external unit, converting said received print data into dot image data at every one of bands defined by dividing an image area of one page, and outputting said dot image data to a printer so as to form all the image of one page corresponding to said print data on a piece of printing paper, comprising:

analysis means for sequentially analyzing print data received from said external unit and converting said print data into intermediate data;

first storage means for storing said intermediate data converted by said analysis means, said first storage means comprising plural first memory areas for respective bands, each first memory area having a predetermined memory capacity;

first memory area setting means for setting in said first storage means a second memory area having a predetermined memory capacity for storing said intermediate data therein when the amount of said intermediate data included in one band is larger than said memory capacity of said first memory area corresponding to said band;

second memory area setting means for setting in said first storage means another second memory area having the same memory capacity as that of said second memory area for storing said intermediate data therein when the amount of said intermediate data included in one band is larger than said memory capacity of said second memory area;

register means for judging which band said intermediate data stored in said memory areas set by said first and second memory area setting means belong to, and registering judged band information of said intermediate data in a band table of a further storage means;

development means for developing said intermediate data included in the same band into dot image data included in said same band every band referring to said band information registered in said band table;

second storage means for storing said dot image data developed by said development means; and output means for outputting said dot image data stored by said second storage means to said printer.

6. The apparatus as claimed in claim 5, wherein said second storage means comprises at least two memories for storing and reading out said dot image data included in one band, alternately.

7. The apparatus as claimed in claim 6, wherein each of said two memories has a memory capacity capable of storing dot image data included in one band.

8. A print data processing apparatus for an image forming apparatus for sequentially receiving print data of plural documents from an external unit, converting said received print data into dot image data at every one of bands defined by dividing an image area of one page, and outputting said dot image data to a printer so as to form all the image of one page corresponding to said print data on a piece of printing paper, comprising:

analysis means for sequentially analyzing print data received from said external unit and converting said print data into intermediate data;

first storage means for storing said intermediate data converted by said analysis means;

register means for registering therein information of the document and the band to which said intermediate data stored in said first storage means belong;

development means for developing said intermediate data into dot image data every band from a predetermined document referring to said information registered by said register means;

second storage means for storing said dot image data developed by said development means;

output means for outputting said dot image data stored by said second storage means to said printer;

stop means for stopping the operation of said analysis means when there becomes no empty memory area in said first storage means;

judgment means for judging whether or not the number of the documents whose intermediate data have been already converted by said analysis means is equal to or larger than a predetermined number of the documents to be printed continuously when the operation of said analysis means is stopped by said stop means;

wait means for enabling said development means to perform said development process and waiting until there is caused an empty area in said first storage means when it is judged by said judgment means that the number of the documents whose intermediate data have been already converted by said analysis means is equal to or larger than a predetermined number of the documents to be printed continuously; and cancel means for disabling said stop means to stop the operation of said analysis means when there is caused an empty area in said first storage means after said wait means waits.

9. The apparatus as claimed in claim 8, wherein said second storage means comprises at least two memories for storing and reading out said dot image data included in one band, alternately.

10. The apparatus as claimed in claim 9, wherein each of said two memories has a memory capacity capable of storing dot image data included in one band.

11. A print data processing apparatus for an image forming apparatus for receiving print data from an external unit, converting said received print data into dot image data at every one of bands defined by dividing an image area of one page, and outputting said dot image data to a printer so as to form all the image of one page corresponding to said print data on a piece of printing paper, comprising:

- analysis means for sequentially analyzing print data received from said external unit and converting said print data into intermediate data;
- first storage means for storing said intermediate data converted by said analysis means;
- second storage means for storing data;
- register means for judging to which band said intermediate data stored by said first storage means belong, and registering the judged band information of said intermediate data in a band table of the second storage means;
- development means for developing said intermediate data into dot image data for every band in said band table;
- third storage means having a first storage area and a second storage area for storing said dot image data developed by said development means, each of said storage areas having enough storage capacity for storing dot image data corresponding to any one of said bands of image area;
- input means for selectively inputting said dot image data developed by said development means into one of said first and second storage area of said third storage means;
- output means for selectively outputting said dot image data from one of said first and second storage area of said third storage means to said printer; and
- control means for controlling said input means and output means such that said input means inputs said dot image data developed by said development means into said first storage area while said output means outputs the dot image data from said second storage area and subsequently that said input means inputs said dot image data developed by said development means into said second storage area while said output means outputs the dot image data from said first storage area.

12. The apparatus as claimed in claim 11, wherein the sequence of inputting and outputting dot image data to and from the third storage means repeats continuously during the printing operation.

13. A print data processing apparatus for an image forming apparatus for sequentially receiving print data of documents of plural pages from an external unit, converting said received print data into dot image data at every one of bands defined by dividing an image area of a document of one page, and outputting said dot image data to a printer so as to form all the image of the document of one page corresponding to said print data on a piece of printing paper, comprising:

- analysis means for sequentially analyzing print data received from said external unit and converting said print data into intermediate data;
- first storage means for storing said intermediate data converted by said analysis means;
- register means for registering therein information of the document and the band to which said intermediate data stored in said first storage means belong;
- development means for developing said intermediate data into dot image data for every band referring to said information registered by said register means;
- second storage means having a first storage area and a second storage area for storing said dot image data developed by said development means, each of said storage areas having enough storage capacity for storing dot image data corresponding to any one of said bands of image area;
- input means for selectively inputting said dot image data developed by said development means into one of said first and second storage areas of said second storage means;
- output means for selectively outputting said dot image data from one of said first and second storage areas of said second storage means to said printer; and
- control means for controlling said input means and output means such that said input means inputs said dot image data developed by said development means into said first storage area while said output means outputs the dot image data from said second storage area and subsequently that said input means input said dot image data developed by said development means into said second storage area while said output means outputs the dot image data from said first storage area.

14. The apparatus as claimed in claim 13, wherein the sequence of inputting and outputting dot image data to and from the second storage means repeats continuously during the printing operation.

* * * * *